(12) United States Patent
Arai et al.

(10) Patent No.: US 8,103,778 B2
(45) Date of Patent: Jan. 24, 2012

(54) NETWORK OPERATIONS MANAGEMENT METHOD AND APPARATUS

(75) Inventors: Daisuke Arai, Fujimino (JP); Kiyohito Yoshihara, Fujimino (JP); Akira Idoue, Fujimino (JP)

(73) Assignee: KDDI Corporation, Tokyo (JP)

( * ) Notice: Subject to any disclaimer, the term of this patent is extended or adjusted under 35 U.S.C. 154(b) by 134 days.

(21) Appl. No.: 12/502,563

(22) Filed: Jul. 14, 2009

(65) Prior Publication Data

US 2010/0017517 A1    Jan. 21, 2010

(30) Foreign Application Priority Data

Jul. 17, 2008  (JP) ................. 2008-185995

(51) Int. Cl.
    *G06F 15/173* (2006.01)
(52) U.S. Cl. ...................................... 709/226
(58) Field of Classification Search ............ 709/226
    See application file for complete search history.

(56) References Cited

U.S. PATENT DOCUMENTS

| 7,577,722 | B1 * | 8/2009 | Khandekar et al. ........ 709/220 |
| 2009/0144393 | A1 * | 6/2009 | Kudo ........................... 709/218 |
| 2009/0237404 | A1 * | 9/2009 | Cannon, III .................. 345/440 |

FOREIGN PATENT DOCUMENTS

JP  2007-310791 A  11/2007

OTHER PUBLICATIONS

VMware, VMware Infrastructure: Resource Management with VMware DRS, 2006, p. 1-24.*
Vmware, VMware Infrastructure 3: Distributed Power Management, Dec. 3, 2007, p. 1-2.*
Cabletron Systems, "Port Based VLAN User's Guide", 1997, pp. 7, 32-33.*
"Virtualization Basics", http://www.vmware.com/technology/virtualization.html, pp. 1-2, 2009.
"XenBrochure", www.xen.org, pp. 1-2. 2009.
"Power Saving Technology With Virtualization", by K. Hatasaki et al., *IEICE Technical Report*, (2006), pp. 37-42 with English Abstract.
"Vmware Distributed Power Management Concepts and Use", Information Guide, pp. 1-11, 2009.

* cited by examiner

*Primary Examiner* — Andrew Caldwell
*Assistant Examiner* — Ryan Jakovac
(74) *Attorney, Agent, or Firm* — Westman, Champlin & Kelly, P.A.

(57) ABSTRACT

The present invention provides a network operations management method and apparatus which realizes efficient power-saving by enabling virtual servers to move between physical servers beyond network segments. A reallocation design unit 13 designs reallocation of virtual servers to physical servers so that necessary resource amounts are assigned to all virtual servers. When virtual servers VS need to move between physical servers PS beyond network segments NS for the designed reallocation, a grouping unit 14 changes a network segment NS to which physical servers PS are connected by changing the configuration of a router and switches. A reallocation unit 15 realizes efficient power-saving by reallocating the virtual servers to the physical servers based on the design made by the reallocation design unit 13.

1 Claim, 10 Drawing Sheets

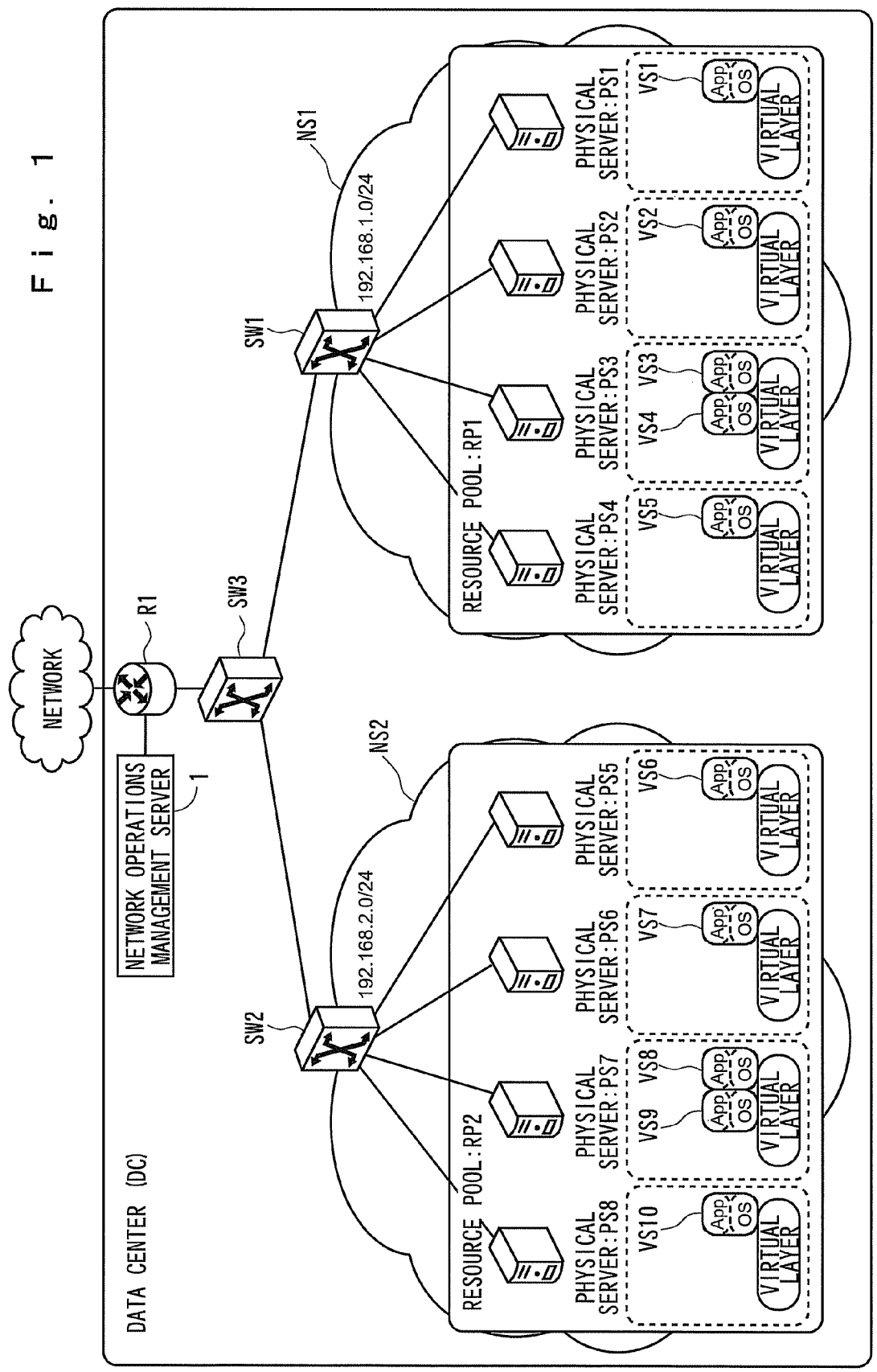

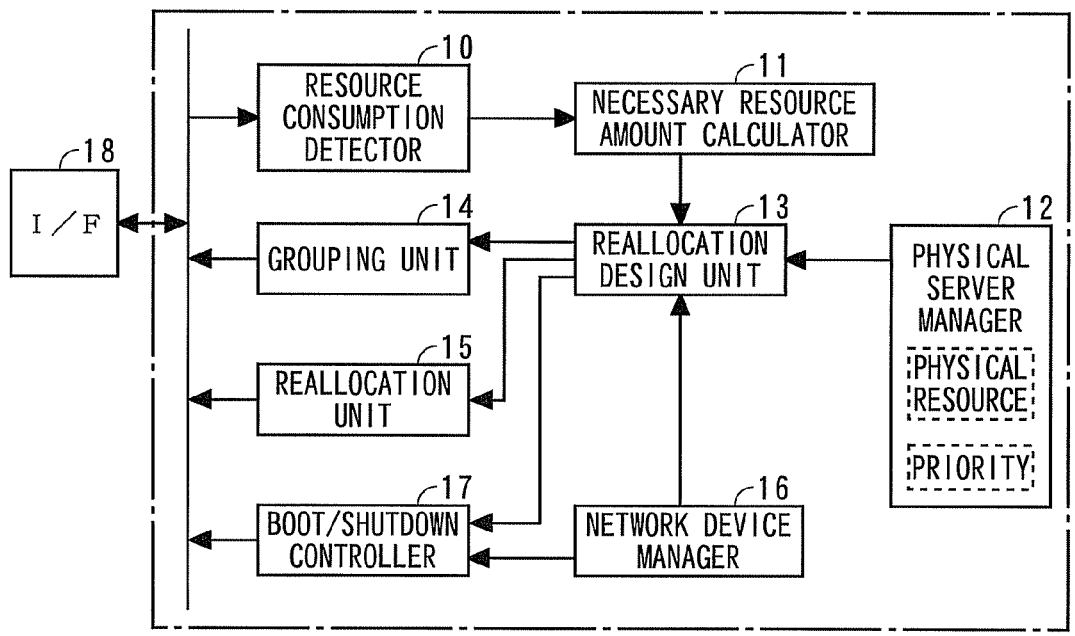

PHYSICAL SERVER PS1 = VIRTUAL SERVER VS1, VS2, VS3
PHYSICAL SERVER PS2 = VIRTUAL SERVER VS4, VS5
PHYSICAL SERVER PS3 = VIRTUAL SERVER VS6, VS7, VS8
PHYSICAL SERVER PS4 = VIRTUAL SERVER VS9, VS10
PHYSICAL SERVER PS5 = (BLANK)
PHYSICAL SERVER PS6 = (BLANK)
PHYSICAL SERVER PS7 = (BLANK)
PHYSICAL SERVER PS8 = (BLANK)

FIRST RESOURCE POOL RP1 = PHYSICAL SERVER PS1, PS2
SECOND RESOURCE POOL RP2 = PHYSICAL SERVER PS3, PS4

NETWORK OPERATIONS MANAGEMENT METHOD AND APPARATUS

The present application is claims priority of Japanese Patent Application Serial No. 2008-185995, filed Jul. 17, 2008, the content of which is hereby incorporated by reference in its entirety.

BACKGROUND OF THE INVENTION

1. Field of the Invention

The present invention relates to a network operations management method and apparatus which operates each of a plurality of physical servers logically as at least one virtual server and dynamically changes virtual servers to be allocated to the respective physical servers by moving the virtual server between the physical servers.

2. Description of the Related Art

A virtualization technique for effectively utilizing computer resources (physical resources) of a plurality of physical servers by operating each of the physical servers logically as at least one server (virtual server) is known.

Non-patent documents 1 and 2 disclose techniques for improving the efficiency of the operations of network devices and servers by using such a virtualization technique. The VMware ESX disclosed in Non-patent document 1 is a technique for constructing a plurality of virtual servers by dividing physical resources such as a processor, memory, storage, and network bandwidth, etc., of a physical server. According to this VMware ESX, a plurality of virtual servers can operate concurrently by sharing physical resources on the same physical server.

Patent document 1 and Non-patent documents 3 and 4 disclose techniques for further improving the efficiency of operations by (1) assigning physical resources to virtual servers and (2) dynamically changing the physical servers which operate the virtual servers according to the use of the virtual servers by applying the virtualization technique.

FIG. 9 and FIG. 10 are block diagrams schematically showing an operations optimization method using a conventional virtualization technique. In the data center DC, two network segments NS1 (192.168.1.0/24) and NS2 (192.168.2.0/24) connected to a network via a router R1 and switches SW1, SW2, and SW3 exist. To the first network segment NS1, four physical servers PS1, PS2, PS3, and PS4 are connected, and similarly, to the second network segment NS2, four physical servers PS5, PS6, PS7, and PS8 are connected.

In the conventional technique, a plurality of physical servers are bundled in logical groups, and in each logical group, (1) physical resources are assigned to virtual servers and (2) physical servers which operate virtual servers are dynamically changed. Here, the logical group is referred to as a resource pool RP. Generally, a virtual server must continuously use the same address even after the physical server on which the virtual server itself operates is dynamically changed, so that the physical servers connected to the same network segment are bundled in the same resource pool RP. In the example of FIG. 9 and FIG. 10, the physical server group connected to the network segment NS1 is bundled in the resource pool RP1, and the physical server group connected to the network segment NS2 is bundled in the resource pool RP2.

In each of the physical servers PS1 to PS8, the VMware ESX is installed as a virtualization platform, and the physical resources (processors, memories, storages, and network resources, etc.) of the physical servers are virtually divided and assigned to the respective virtual servers.

In a time period with comparatively high utilization of virtual servers such as during daytime or working hours, all physical servers PS1 to PS8 are running as shown in FIG. 9, and various application Apps are executed in a dispersed manner on the operating systems of the plurality of virtual servers which operate on the physical servers PS. On the other hand, during nighttime or outside of working hours in which the access number is less, as shown in FIG. 10, in the first resource pool RP1, three virtual servers which had operated on the two physical servers PS3 and PS4 are consolidated into two physical servers PS1 and PS2, and two physical servers PS3 and PS4 are turned into a turned-off state or a hibernation state with less power consumption.

Similarly, in the second resource pool RP2, three virtual servers which had operated on two physical servers PS7 and PS8 are consolidated into two physical servers PS5 and PS6, and two physical servers PS7 and PS8 are turned into a turned-off state or a hibernation state.

Patent document 1: Japanese Published Unexamined Patent Application No. 2007-310791
Non-patent document 1: VMware: http://www.vmware.com/
Non-patent document 2: Xen: http://www.xen.org/
Non-patent document 3: "Power saving technology with visualization"; IEICE (The Institute of Electronics, Information and Communication Engineers) technical report. Computer systems, vol. 106, no. 436, CPSY2006-44, pp. 37-42, December 2006.
Non-Patent document 4: VMware Distributed Power Management (DPM)

In the above-described conventional technique, a virtual server cannot be moved between physical servers in different network segments (that is, in different resource pools), so that it is difficult to sufficiently improve the efficiency.

As in the conventional technique shown in FIG. 10, when virtual servers are allocated to the respective physical servers, the physical servers PS3, PS4, PS7, and PS8 can be shutdown, so that power-saving can be realized to some degree. However, the total power consumption of the data center DC greatly depends on the power consumption of air-conditioning equipment, lighting facilities, and switches SW for switching the lines of the physical servers as well as the power consumption of the physical servers. Therefore, as shown in FIG. 11, when the resource pools RP1 and RP2 are installed in different rooms, if all virtual servers can be allocated to the physical servers installed in one room 1, all of the physical servers PS and switches SW thereof allocated in the other room 2 can be shutdown, and the air-conditioning equipment and lighting facilities in the room 2 can also be stopped.

However, with the above-described conventional technique, grouping of the physical servers bundled in the respective resource pools cannot be dynamically changed, so that it is difficult to further save power by reallocating the virtual servers between physical servers beyond the network segments as described in FIG. 11.

SUMMARY OF THE INVENTION

An object of the present invention is to provide a network operations management method and apparatus which realizes efficient power-saving by enabling virtual servers to move between physical servers beyond network segments.

The present invention provides a network operations management apparatus which operates each of a plurality of physical servers logically as at least one virtual server and dynamically moves virtual servers between the physical servers based on the resource consumption of each virtual server, including: a means for detecting the resource consumption of each virtual server allocated to the physical servers; a means for calculating the necessary resource amount of each virtual server based on the resource consumption; a means for designing allocation of the virtual servers to the physical servers based on the necessary resource amount of each virtual server and physical resources of the physical servers so that the necessary resource amounts are assigned to the virtual servers; a means for logically changing the network segment of the physical server to which the virtual servers move so that the network segment of the virtual servers is not changed even after reallocation; and a means for reallocating the virtual servers to the physical servers based on results of the reallocation design.

According to the present invention, in conjunction with a dynamic change of physical servers on which virtual servers are operated according to the use of the virtual servers, the network segment of the physical server to which the virtual servers move can be logically changed, so that the virtual servers become movable between the physical servers beyond the network segments. Therefore, by allocating the virtual servers preferentially to physical servers which share air-conditioning equipment and lighting facilities or preferentially allocating the virtual servers to the physical servers connected to a common network device, efficient power-saving is realized.

BRIEF DESCRIPTION OF THE DRAWINGS

FIG. 1 is a block diagram showing a configuration of a network to which the present invention is applied;

FIG. 2 is a block diagram showing a configuration of a network operations management server;

FIG. 4 is a view showing a list of examples of results of the reallocation design;

DETAILED DESCRIPTION OF THE PREFERRED EMBODIMENT

Figure 3:
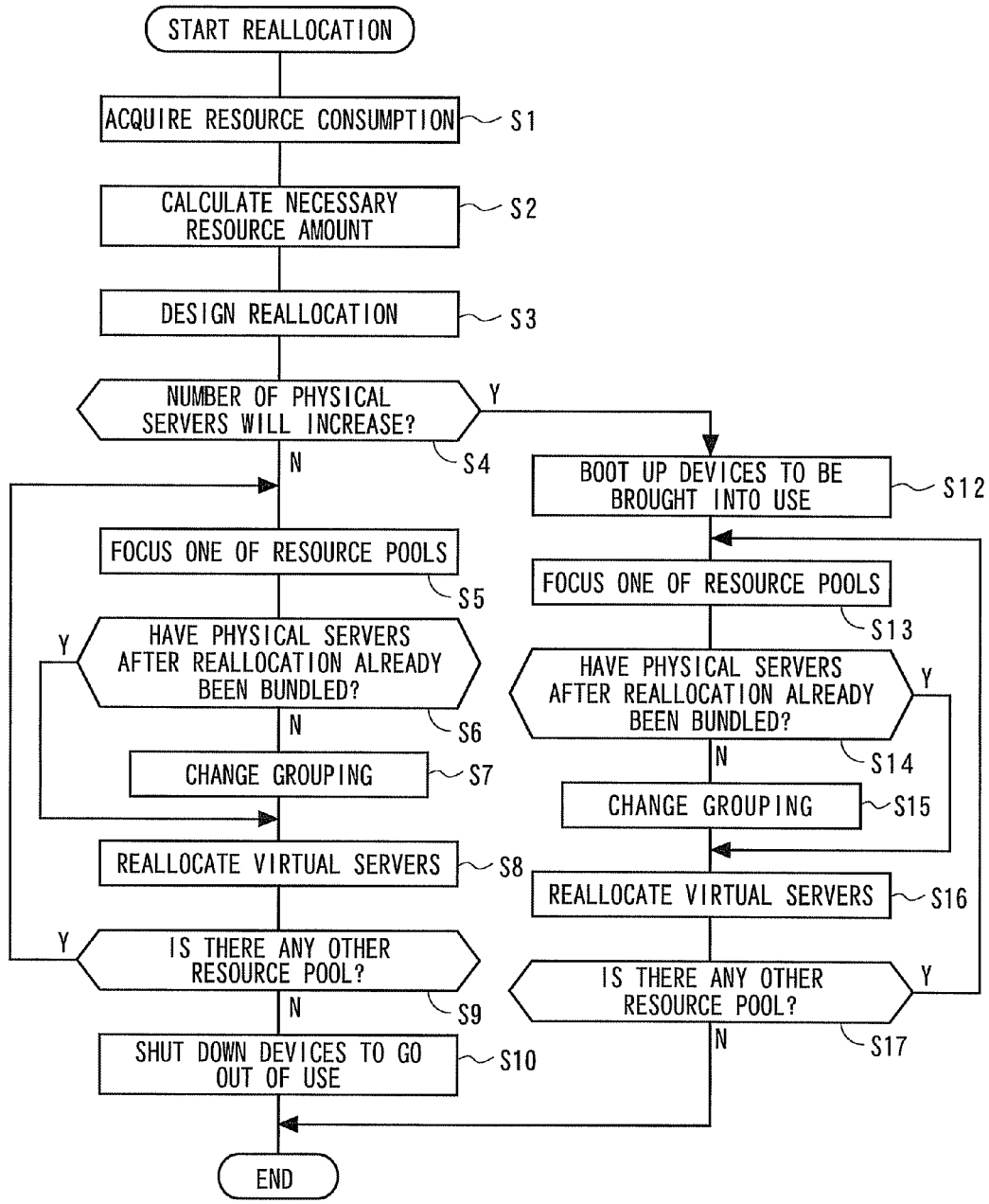
FIG. 3 is a flowchart showing operations of an embodiment of the present invention.

FIG. 1 is a block diagram showing a configuration of a network to which a network operations management method of the present invention is applied, and in a data center DC, two network segments NS1 (192.168.1.0/24) and NS2 (192.168.2.0/24) connected via a router R1 and switches SW1, SW2, and SW3 exist. To the router R1, a network (NW) operations management apparatus (server) 1 of the present invention is connected.

In the present embodiment, the router R1 and the switches SW1, SW2, and SW3 support the VLAN (Virtual LAN) function to make it possible to logically change the network segment of physical servers as a destination to which virtual servers move without a physical connection change by separating a physical connection configuration and a logical connection configuration of the network in response to an instruction from the NW operations management server 1.

In FIG. 1, in the first resource pool RP1 of the first network segment NS1, four physical servers PS1, PS2, PS3, and PS4 are bundled, and similarly, in the resource pool RP2 of the second network segment NS2, four physical servers PS5, PS6, PS7, and PS8 are bundled. In each of the physical servers PS1 to PS8, a virtualization platform (virtual layer) such as the VMware ESX is installed, and physical resources such as processors, memories, storages, and network bandwidths, etc., of the physical servers PS are divided and assigned to a plurality of virtual servers VS.

Here, virtual servers VS1 and VS2 are allocated to the physical servers PS1 and PS2, respectively, two virtual servers VS3 and VS4 are allocated to the physical server PS3, virtual servers VS5, VS6, and VS7 are allocated to the physical servers PS4, PS5, and PS6, respectively, two virtual servers VS8 and VS9 are allocated to the physical server PS7, and one virtual server VS10 is allocated to the physical server PS10.

FIG. 2 is a block diagram showing a configuration of a major section of the NW operations management server 1, and here, components unnecessary for the description of the present invention are omitted.

A resource consumption detector 10 detects actual resource consumption of each virtual server VS allocated to the physical servers PS. The necessary resource amount calculator 11 calculates the necessary resource amount of each virtual server VS based on the resource consumption. The physical server manager 12 manages the physical resources and priorities of the physical servers PS.

The reallocation design unit 13 designs reallocation of virtual servers VS on physical servers PS based on the necessary resource amount of each virtual server VS and physical resources and priorities of physical servers PS so that the necessary resource amounts are assigned to all virtual servers VS.

In other words, the reallocation design unit 13 designs the reallocation of virtual servers to physical servers by assigning the resources according to the priorities of the physical servers so that, for example, the sum of the necessary resource amounts of the virtual servers VS calculated by the necessary resource amount calculator 11 does not exceed the physical resources of the physical server as a destination to which the virtual servers move even after reallocation without consideration of the network segments of the physical servers.

A grouping unit 14 reallocates the virtual servers according to the design designed by the reallocation design unit 13. The grouping unit 14 further changes the network segments NS of the physical servers PS by changing the VLAN configuration of the router R and the switches SW1, SW2, and SW3 when virtual servers VS must move between the physical servers PS beyond the network segments NS for realizing reallocation as designed.

The NW device manager 16 manages the topology of the network. The boot/shutdown controller 17 shuts down the physical servers PS to which virtual servers VS are not reallocated when they are reallocated, and newly boots up physical servers PS on which virtual servers VS are reallocated when they are reallocated. The boot/shutdown controller 17 further shuts down network devices connected only to the physical servers PS which are shutdown by the reallocation, and on the other hand, reboots network devices being shut down which are connected to the physical servers PS booted by the reallocation.

Figure 8:
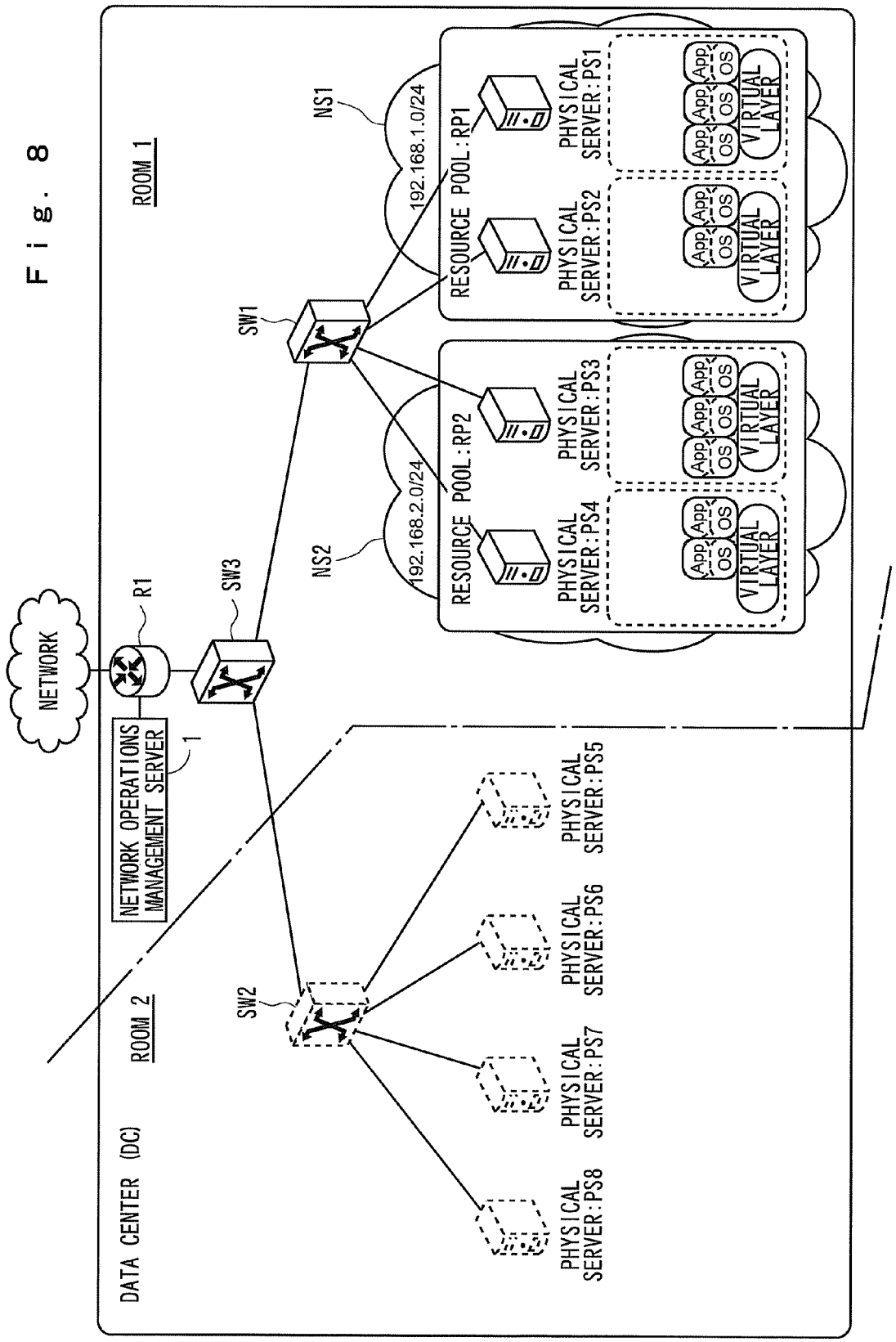
FIG. 8 is a block diagram showing a state immediately after devices are shutdown at Step S10.
Figure 9:
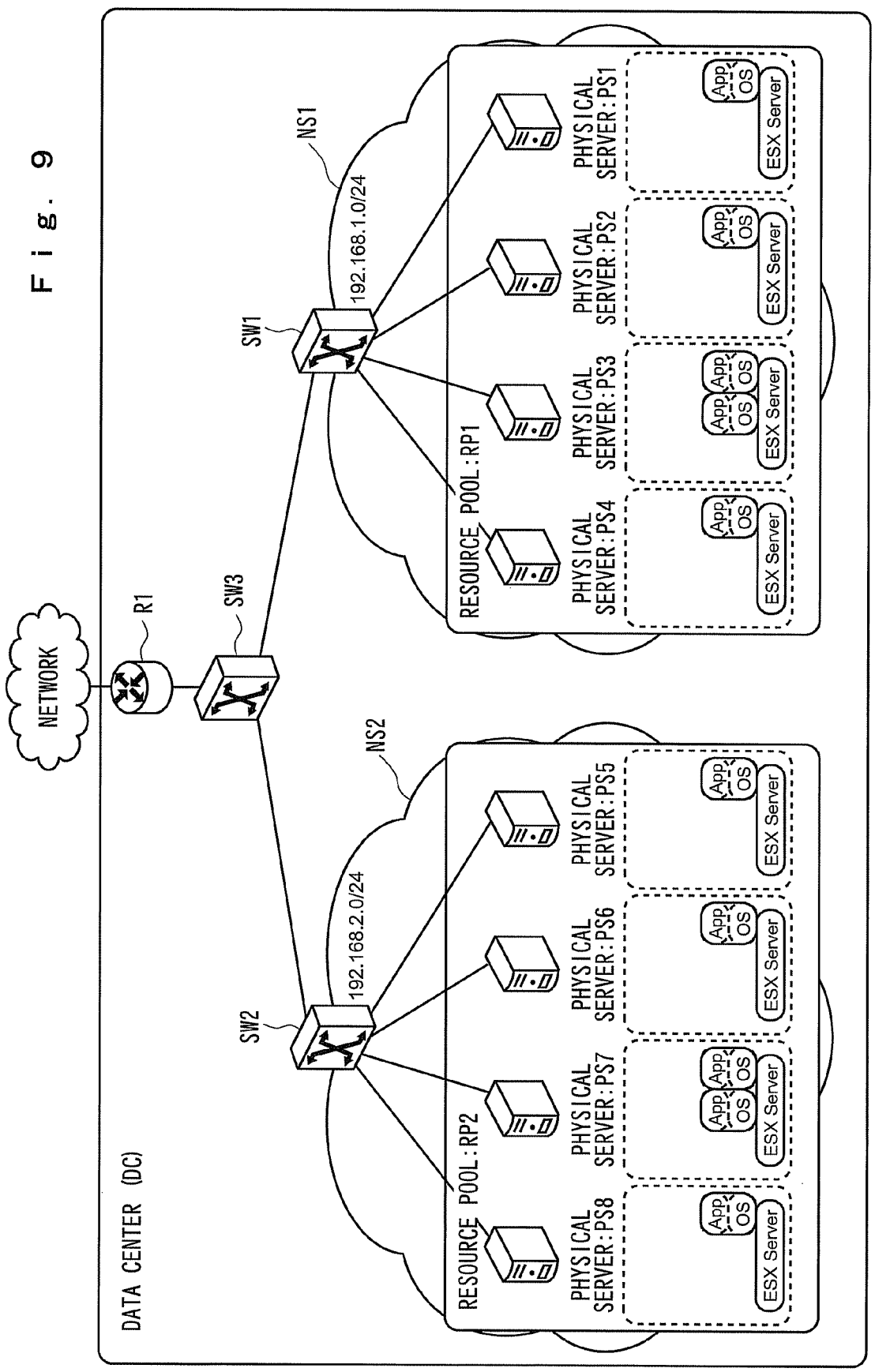
FIG. 9 is a block diagram showing an operations optimization method using a conventional virtualization technique.
Figure 10:
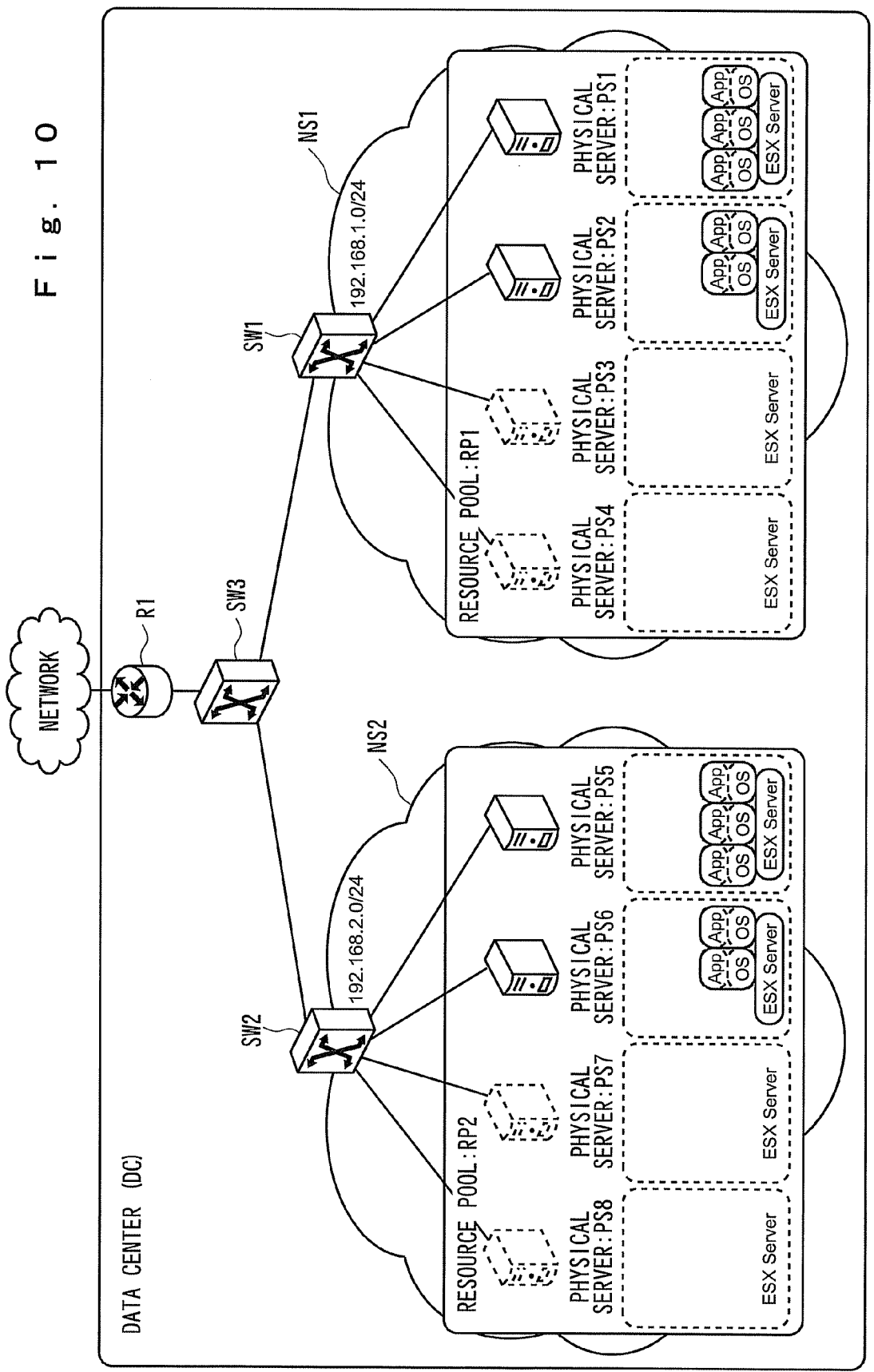
FIG. 10 is a block diagram showing an operations optimization method using a conventional virtualization technique.
Figure 11:
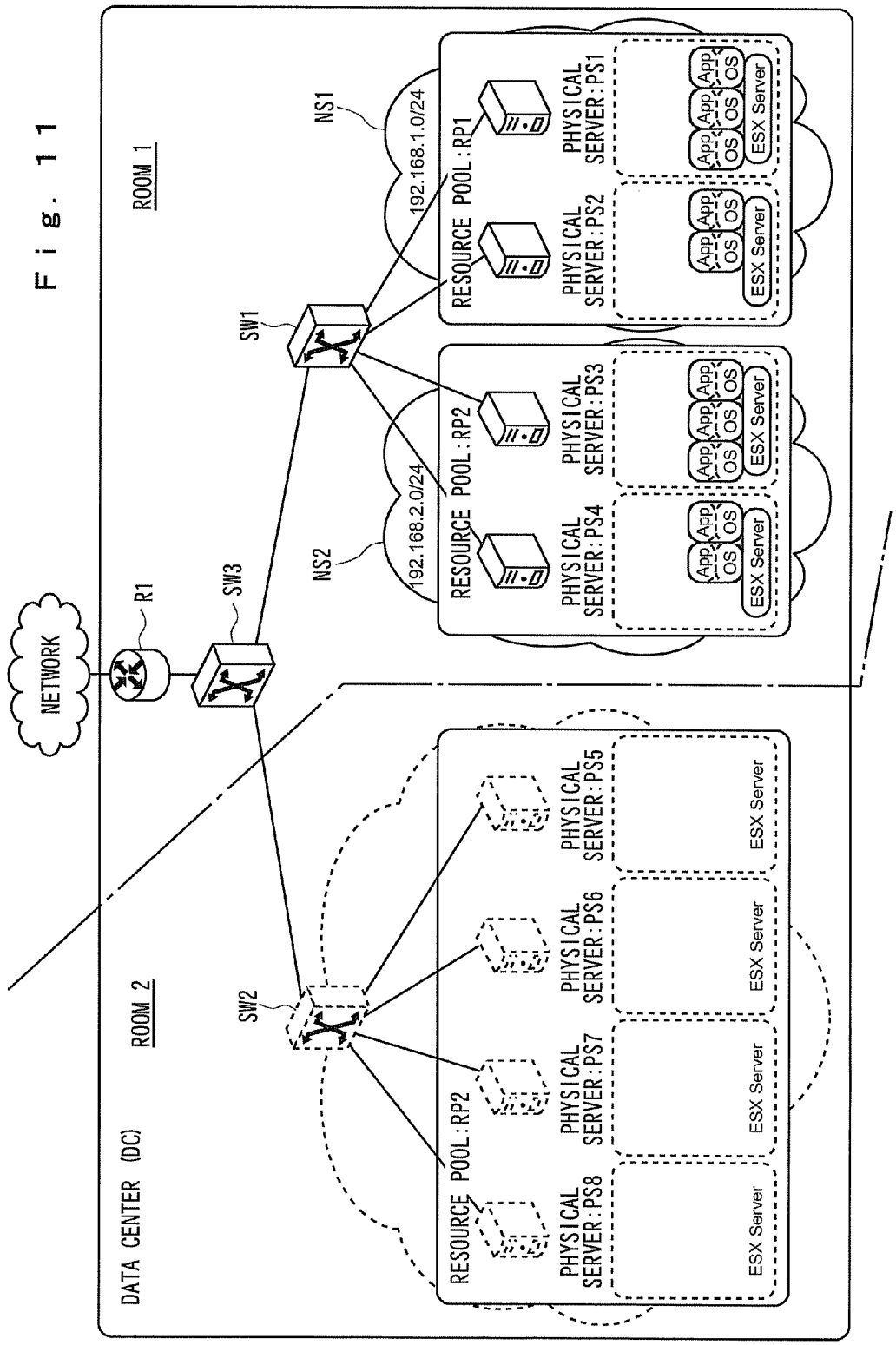
FIG. 11 is a block diagram showing an example of an ideal operations optimization method.

Next, operations of the present embodiment will be described in detail with reference to the flowchart of FIG. 3. Here, first, operations in the case where the virtual servers VS are reallocated on a part of the physical servers PS as shown in FIG. 8 from the state where the virtual servers VS are allocated to the physical servers PS as shown in FIG. 1 are described, and then, operations in the case of reallocation from the state of FIG. 8 to the state of FIG. 1 will be described.

At Step S1, current resource consumption is acquired from all virtual servers VS1 to VS10 on the physical servers PS by the resource consumption detector 10. In the present embodiment, resource consumption of the processors, memories, HDDs, and network bandwidths in the virtual servers VS is acquired. At Step S2, in the necessary resource amount calculator 11, current resource consumption of each virtual server VS acquired by the resource consumption detector 10 is multiplied by a surplus assignment ratio in anticipation of resource consumption increases after reallocation to calculate the necessary resource amount of each virtual server VS after being reallocated. In the present embodiment, as the surplus assignment ratio, for example, a coefficient not less than 1.0 is used.

At Step S3, the reallocation design unit 13 designs allocation of the virtual servers VS to the physical servers PS based on the necessary resource amount of each virtual server VS and physical resources and priorities of the physical servers PS so that the necessary resource amounts are assigned to all virtual servers VS.

In the present embodiment, allocation is designed on the conditions that (1) the sum of necessary resource amounts of virtual servers VS does not exceed the physical resources of a physical server PS to which the virtual servers are allocated, (2) the number of physical servers to run becomes the minimum, (3) virtual servers are preferentially allocated to physical servers with higher priorities, and (4) virtual servers which had operated on physical servers bundled in different resource pools are not allocated to the same physical server.

The condition (1) means that, when the capacity of an HDD installed in a physical server PS is 1 terabyte, the reallocation is designed so that the sum of HDD necessary resource amounts of all virtual servers to be allocated to this physical server PS becomes not more than 1 terabyte. Concerning the condition (3), in the present embodiment, the priorities of four physical servers PS1, PS2, PS3, and PS4 connected to the switch SW1 are set to be higher than the priorities of other physical servers. The condition (4) means that, for example, when using FIG. 1 as an example, the resource pool RP1 of the physical server PS4 to which the virtual server VS5 is allocated and the resource pool RP2 of the physical server PS5 to which the virtual server VS6 is allocated are different from each other, so that the virtual servers VS5 and VS6 are not reallocated to the same physical server.

Here, as listed in FIG. 4, the description will be continued on the assumption that the design was made so that the four physical servers PS1, PS2, PS3, and PS4 with higher priorities were run continuously, and the remaining four physical servers PS5, PS6, PS7, and PS8 were shutdown, three virtual servers VS1, VS2, and VS3 were allocated to the physical server PS1, two virtual servers VS4 and VS5 were allocated to the physical server PS2, three virtual servers VS6, VS7, and VS8 were allocated to the physical server PS3, and two virtual servers VS9 and VS10 were allocated to the physical server PS4.

As described in detail later in "grouping change" of Step S7 and Step S15, in the present embodiment, to make it possible that the virtual servers VS6, VS7, VS8, VS9, and VS10 which are allocated to the physical servers, PS5, PS6, PS7, and PS8 bundled in the second resource pool RP2 are allocated to the physical servers PS3 and PS4 bundled in the first resource pool RP1, by changing the VLAN configuration of the router R and the switches SW1, SW2, and SW3 in conjunction with a dynamic change of physical servers which operate the virtual servers according to the use, the destination to which the physical servers PS3 and PS4 are connected is dynamically changed to the same network segment as that of the physical servers PS5, PS6, PS7, and PS8.

Returning to FIG. 3, at Step S4, it is determined whether the number of physical servers PS to run will increase after the reallocation of the virtual servers, and here, the number of physical servers PS to run will be reduced from 8 to 4, so that the process advances to Step S5. At Step S5, one of the resource pools RP is selected as a current focused resource pool. Here, the description will be continued on the assumption that the first resource pool RP was selected first.

At Step S6, it is determined whether all physical servers PS which will be bundled in the focused resource pool (first resource pool RP1) after the reallocation of the virtual servers have already been bundled in the first resource pool RP1. Here, the two physical servers PS1 and PS2 which will be bundled in the first resource pool RP1 after the reallocation have already been bundled in the first resource pool RP1, so that the process advances to Step S8. At Step S8, the reallocation unit 15 reallocates the virtual servers in the focused resource pool (first resource pool RP1).

Figure 5:
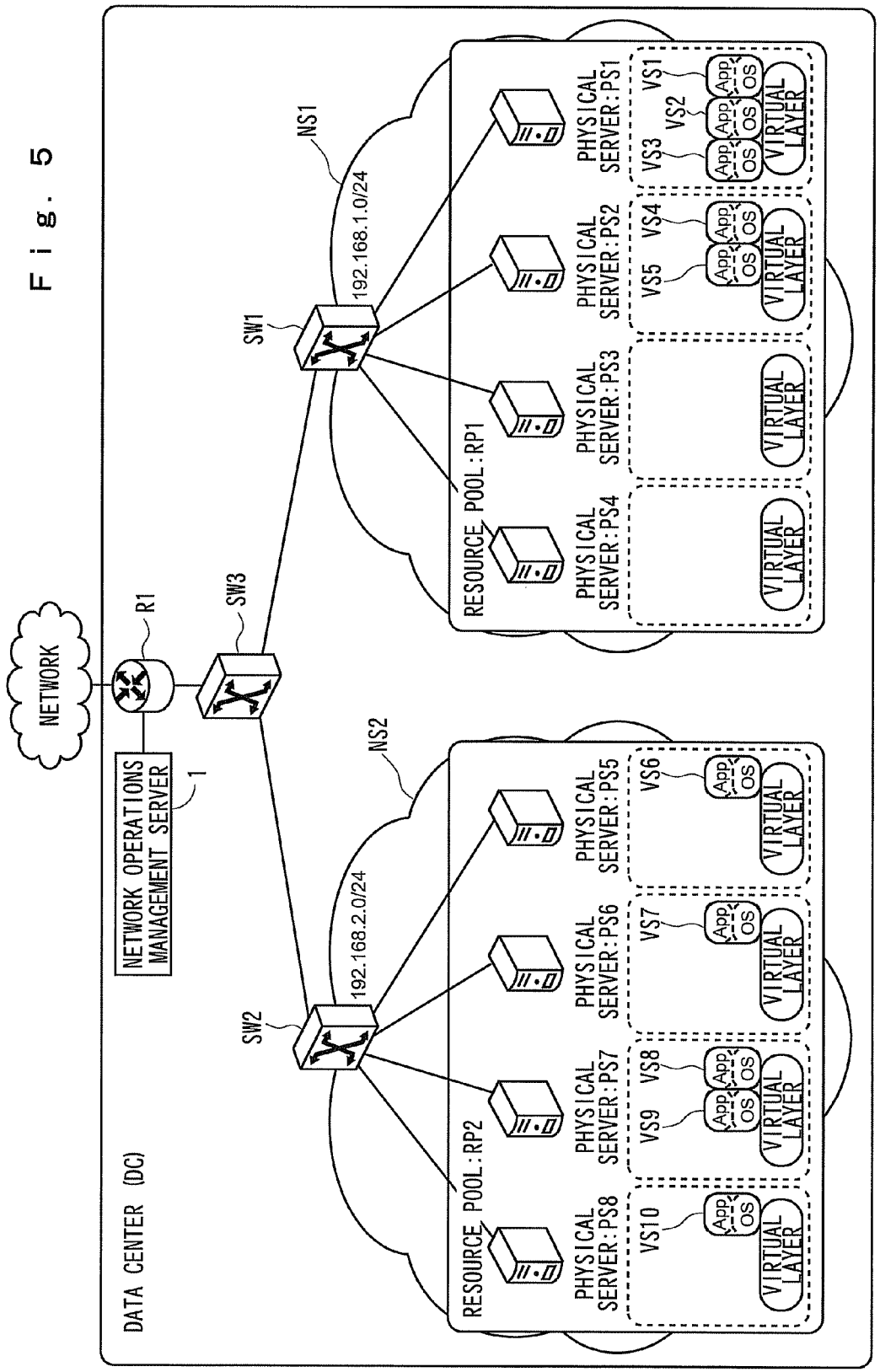
FIG. 5 is a block diagram showing a state immediately after virtual servers are reallocated at Steps S8 and S16.

FIG. 5 is a view showing an allocation state immediately after the virtual servers VS are reallocated at Step S8, and in the first resource pool RP1, three virtual servers VS1, VS2, and VS3 are allocated to the physical server PS1, two virtual servers VS4 and VS5 are allocated to the physical server PS2, and no virtual server is allocated to the physical servers PS3 and PS4.

Returning to FIG. 3, at Step S9, it is determined whether there is a resource pool which has not been focused yet, and here, the second resource pool RP2 exists, so that the process returns to Step S5 and the second resource pool RP2 is selected as a focused resource pool.

At Step S6, it is determined whether all physical servers PS which will be bundled in the focused resource pool (second resource pool RP2) after the reallocation of the virtual servers have already been bundled in the second resource pool RP2. Here, two physical servers PS3 and PS4 which will be bundled in the second resource pool RP2 after reallocation have not been bundled in the second resource pool RP2 yet, so that the process advances to Step S7. At Step S7, to bundle the two physical servers PS3 and PS4 which have not been bundled in the second resource pool RP2 yet in the second resource pool RP2, the configuration of the router R and the switches SW1, SW2, and SW3 is changed by the grouping unit 14, and the two physical servers PS3 and PS4 are connected to the same network segment as that of the physical servers PS5, PS6, PS7, and PS8. The addresses of the two physical servers PS3 and PS4 are also changed to addresses in the same network segment as that of the physical servers PS5, PS6, PS7 and PS8 as appropriate.

Figure 6:
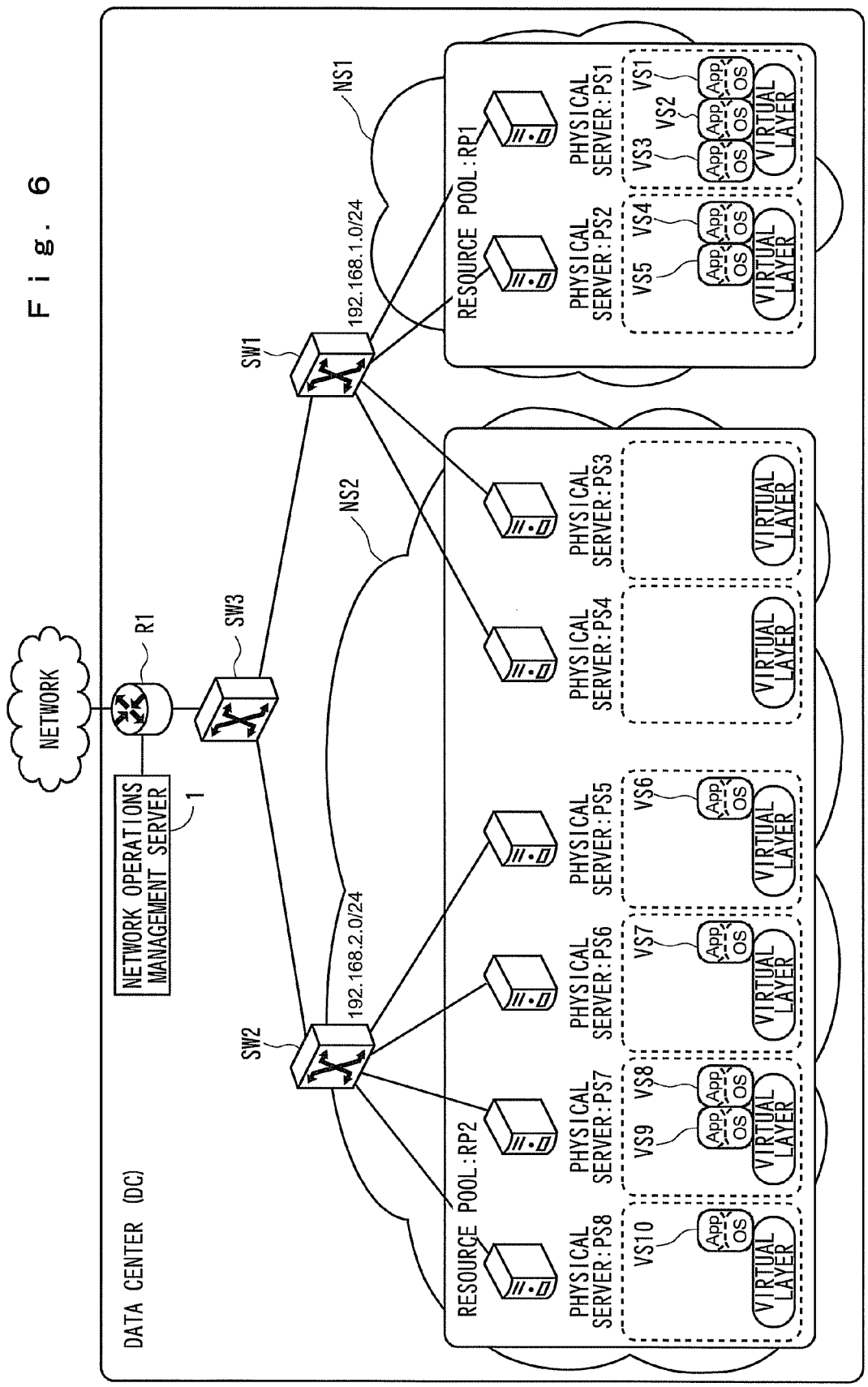
FIG. 6 is a block diagram showing a state immediately after a grouping of physical servers is changed at Steps S7 and S15.

FIG. 6 is a view showing an assignment state immediately after the grouping is changed at Step S7, and the two physical servers PS3 and PS4 which had been bundled in the first resource pool RP1 are bundled in the second resource pool RP2.

Figure 7:
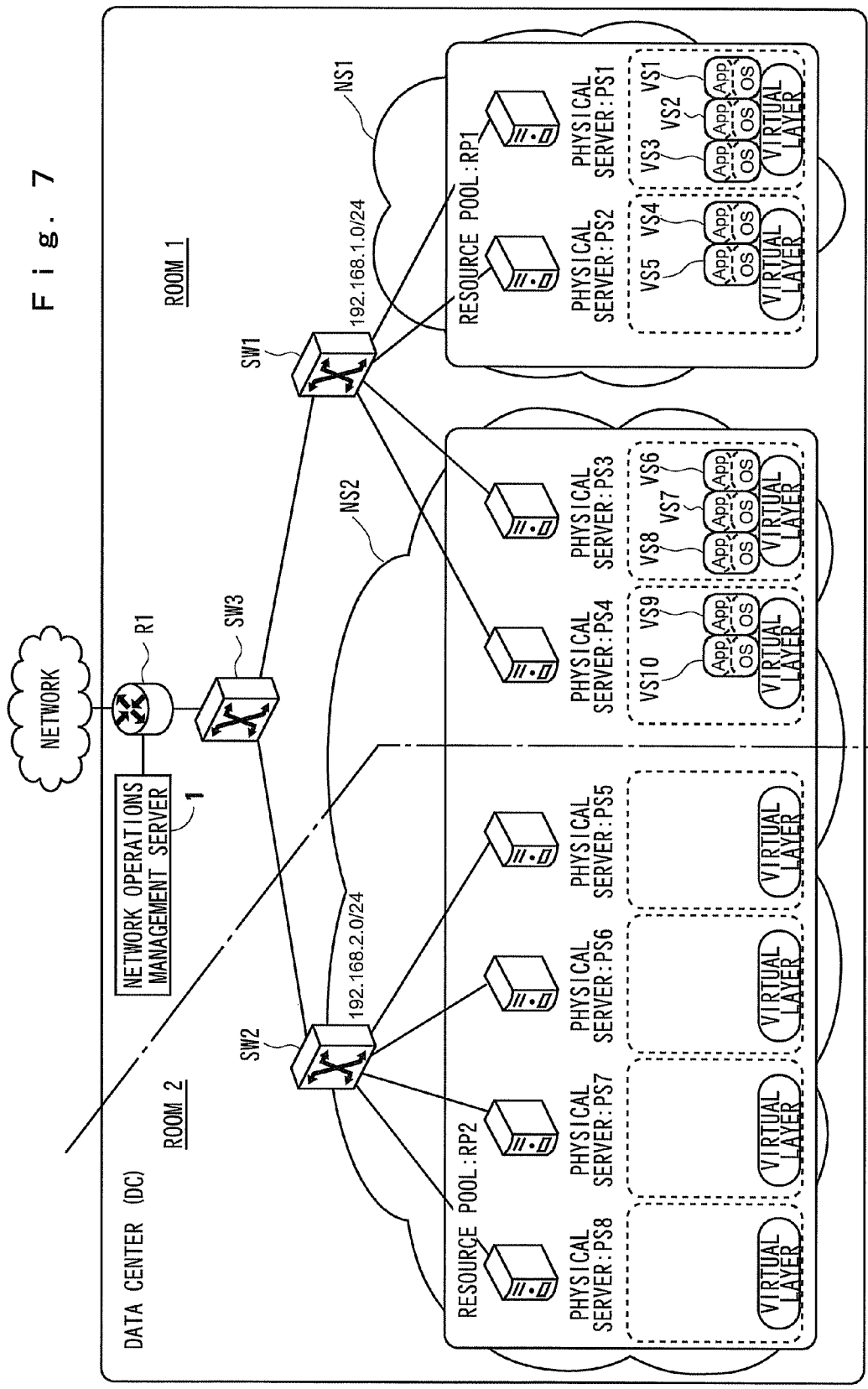
FIG. 7 is a block diagram showing a state immediately after virtual servers are reallocated at Steps S8 and S16.

Returning to FIG. 3, at Step S8, the reallocation unit 15 reallocates the virtual servers in the current focused resource pool (second resource pool RP2). FIG. 7 is a view showing an allocation state immediately after the reallocation is performed at Step S8, and in the second resource pool RP2, three virtual servers VS6, VS7, and VS8 are reallocated to the physical server PS3, and two virtual servers VS9 and VS10 are allocated to the physical server PS4, and no virtual server is allocated to the physical servers PS5, PS6, PS7, and PS8.

Returning to FIG. 3, at Step S10, the boot/shut down controller 17 shuts down network devices which will go out of use after the reallocation of the virtual servers and a group change of the physical servers, that is, four physical servers PS5, PS6, PS7, and PS8 and the switch SW2. In the present embodiment, the power sources of the network devices are turned off or turned into a power-saving mode such as a sleep mode. FIG. 8 is a block diagram schematically showing an allocation state of the virtual servers VS and running states of the devices at this time point, and in the data center DC, the network is shutdown.

Thus, according to the present embodiment, in conjunction with a dynamic change of physical servers which operate the virtual servers according to the use, the network segment of the physical server PS as a destination to which the virtual servers VS move can be changed, so that the virtual server VS can move between the physical servers PS beyond the network segment. Therefore, by allocating the virtual servers VS preferentially to physical servers PS which share the air conditioning equipment and lighting facilities or by allocating the virtual servers VS preferentially to the physical servers PS connected to a common network device, efficient power-saving is realized.

In other words, in the example shown in FIG. 7 and FIG. 8, only the air conditioning equipment and lighting facilities of the room 1 in which the physical servers PS1, PS2, PS3, and PS4 are installed are run, and the air conditioning equipment and lighting facilities of the room 2 in which the physical servers PS5, PS6, PS7, and PS8 are installed are stopped, and accordingly, efficient power-saving is realized.

Next, operations when the allocation and running states of FIG. 8 are changed to the allocation and running states of FIG. 1 will be described with reference to the flowchart of FIG. 3.

From Step S1 to Step S3, the same processing as described above is executed and the reallocation of FIG. 1 is designed. At Step S4, it is determined whether the number of physical servers PS to run will increase after the reallocation of the virtual servers. Here, the number of physical servers PS to run will increase from 4 to 8, so that the process advances to Step S12. At Step S12, devices which will be brought into use are booted up. Here, the physical servers PS5, PS6, PS7, PS8 and switch SW2 being shutdown are booted up by the boot/shut-down controller 17.

At Step S13, one of the resource pools RP is selected as a current focused resource pool. Here, in the order reverse to the order in the case where the physical servers PS decrease, the second resource pool RP2 is selected as the current focused resource pool state. At Step S14, it is determined whether all physical servers PS which will be bundled in the current focused resource pool (second resource pool RP2) after the reallocation of the virtual servers VS have already been bundled in the second resource pool RP2. Here, the four physical servers PS5, PS6, PS7, and PS8 which will be bundled in the second resource pool RP2 after the reallocation have not been bundled yet, so that the process advances to Step S15.

At Step S15, the configuration of the router R1 and the switches SW1, SW2, and SW3 is changed by the grouping unit 14 so that the booted four physical servers PS5, PS6, PS7, and PS8 are bundled in the second resource pool RP2. The addresses of the four physical servers PS5, PS6, PS7, and PS8 are also changed to addresses in the same network segment as that of the physical servers PS3 and PS4 as appropriate. Accordingly, the allocation and running states of the virtual servers become as shown in FIG. 7.

At Step S16, the reallocation unit 15 reallocates the virtual servers in the current focused resource pool (second resource pool RP2). In other words, from the physical servers PS3 and PS4, all virtual servers are moved, the virtual servers VS6 and VS7 are allocated to the physical servers PS5 and PS6, two virtual servers VS8 and VS9 are allocated to the physical server PS7, and the virtual server VS10 is allocated to the physical server PS8. Accordingly, the allocation of the virtual servers becomes as shown in FIG. 6.

At Step S17, it is determined whether there is a resource pool which has not been focused yet, and here, the first resource pool RP1 exists, so that the process returns to Step S13 and the first resource pool RP1 is selected as a focused resource pool.

At Step S14, it is determined whether all physical servers PS which will be bundled in the current focused resource pool (first resource pool RP1) after the reallocation of the virtual servers have already been bundled in the first resource pool RP1. Here, among the four physical servers PS1, PS2, PS3, and PS4 which will be bundled in the first resource pool RP1 after the reallocation, two physical servers PS3 and PS4 have not been bundled yet, so that the process advances to Step S15. At Step S15, the configuration of the router R and the switches SW1, SW2, and SW3 is changed by the grouping unit 14 so that the two physical servers PS3 and PS4 bundled in the second resource pool RP2 are bundled in the first resource pool RP1. The addresses of the two physical servers PS3 and PS4 are also changed to addresses in the same network segment as that of the physical servers PS1 and PS2 as appropriate. Accordingly, the allocation and running states of the virtual servers become as shown in FIG. 5.

At Step S16, the reallocation unit 15 reallocates the virtual servers in the current focused resource pool (first resource pool RP1). In other words, virtual servers VS1 and VS2 are allocated to the physical servers PS1 and PS2, two virtual servers VS3 and VS4 are allocated to the physical server PS3, and the virtual server VS5 is allocated to the physical server PS4. Accordingly, the allocation and running states of the virtual servers become as shown in FIG. 1.

What is claimed is:

1. A network operations management method of a network operations management server which is connected to a plurality of physical servers via a router and switches that support VLAN (Virtual LAN) function, and operates each of a plurality of the physical servers logically as at least one virtual server and virtual servers are dynamically moved between the physical servers based on the resource consumption of each virtual server, comprising the steps of:

detecting the resource consumption of each virtual server allocated to the physical servers;

calculating the necessary resource amount of each virtual server based on the resource consumption;

designing reallocation of the virtual servers to the physical servers based on the necessary resource amount of each virtual server and physical resources of the physical servers so that the necessary resource amounts are assigned to the virtual servers, and further based on virtual servers which had operated on physical servers bundled in different network segments but are not allocated to the same physical server;

logically changing the network segment of the physical server to which the virtual servers move so that the network segment of the virtual servers is not changed even after reallocation; and reallocating the virtual servers to the physical servers based on results of the reallocation design, wherein in the step of logically changing the network segment of the physical server, the network segments of the physical servers are changed to values before the reallocation by changing the VLAN configuration of a router and switches when virtual servers must move between the physical servers beyond the network segments with the designed reallocation, and wherein the step of logically changing the network segment and the step of reallocating the virtual server are performed sequentially, for the network segments before reallocation, by selecting the network segments one by one, and the order in which the network segments are selected one by one is reversed between when the number of physical severs decreases and when it increases.

* * * * *